(12) United States Patent
Marshall

(10) Patent No.: US 6,718,707 B2
(45) Date of Patent: Apr. 13, 2004

(54) CABLE END WEDGE LOCK

(76) Inventor: Frederick S. Marshall, 1710 Cove Meadow Ct., Arlington, TX (US) 76012

( * ) Notice: Subject to any disclaimer, the term of this patent is extended or adjusted under 35 U.S.C. 154(b) by 74 days.

(21) Appl. No.: 10/081,415

(22) Filed: Feb. 22, 2002

(65) Prior Publication Data

US 2003/0159377 A1 Aug. 28, 2003

(51) Int. Cl.$^7$ .............................. E04C 5/08; F16B 2/14; B25G 3/20
(52) U.S. Cl. ................ 52/223.13; 52/223.7; 403/374.1; 403/368; 24/136 R
(58) Field of Search ............................. 52/223.1, 223.7, 52/223.9, 223.13, 223.14; 403/368, 369, 374.1, 223.14; 24/122.6, 136 R, 136 C, 115 N, 265 EE

(56) References Cited

U.S. PATENT DOCUMENTS

| | | | |
|---|---|---|---|
| 1,453,493 A | 5/1923 | Cunningham | |
| 1,875,583 A | 9/1932 | Fox | |
| 2,839,145 A | 6/1958 | York | |
| 5,094,496 A | 3/1992 | King, Sr. | |
| 6,082,063 A | * 7/2000 | Shrive et al. | ............. 52/223.13 |
| 6,381,912 B1 | * 5/2002 | Sorkin | ...................... 52/223.13 |
| 6,560,939 B2 | * 5/2003 | Sorkin | ...................... 52/223.13 |
| 2002/0129570 A1 | * 9/2002 | Sorkin | ...................... 52/223.13 |
| 2002/0157333 A1 | * 10/2002 | Kadotani et al. | .......... 52/223.2 |
| 2002/0178665 A1 | * 12/2002 | Campbell | ................ 52/223.13 |

* cited by examiner

Primary Examiner—Brian E. Glessner
Assistant Examiner—Kevin McDermott
(74) Attorney, Agent, or Firm—Bracewell & Patterson, L.L.P.

(57) ABSTRACT

An assembly for compressing a foundation piling prevents individual piling segments from sliding out of alignment. The assembly is an anchoring device that is lowered into a passageway running through a concrete or steel foundation piling to a desired depth. The anchoring device is suspended to a cable and has a center section and at least one moveable wing or wedge attached to the center section. Then a weight is dropped onto the anchoring device. The force of the impact causes the wings on the anchoring device to slide down and extend away from the center section. The force of the impact also forces the wings to grip the piling because the anchoring assembly is wider than the passageway when the wings slide down the center section. Tension is applied to the cable, which is now secured to the piling by the anchoring device. The tension in the cable creates a compressive state on the piling which prevents the individual segments from sliding out of alignment.

15 Claims, 4 Drawing Sheets

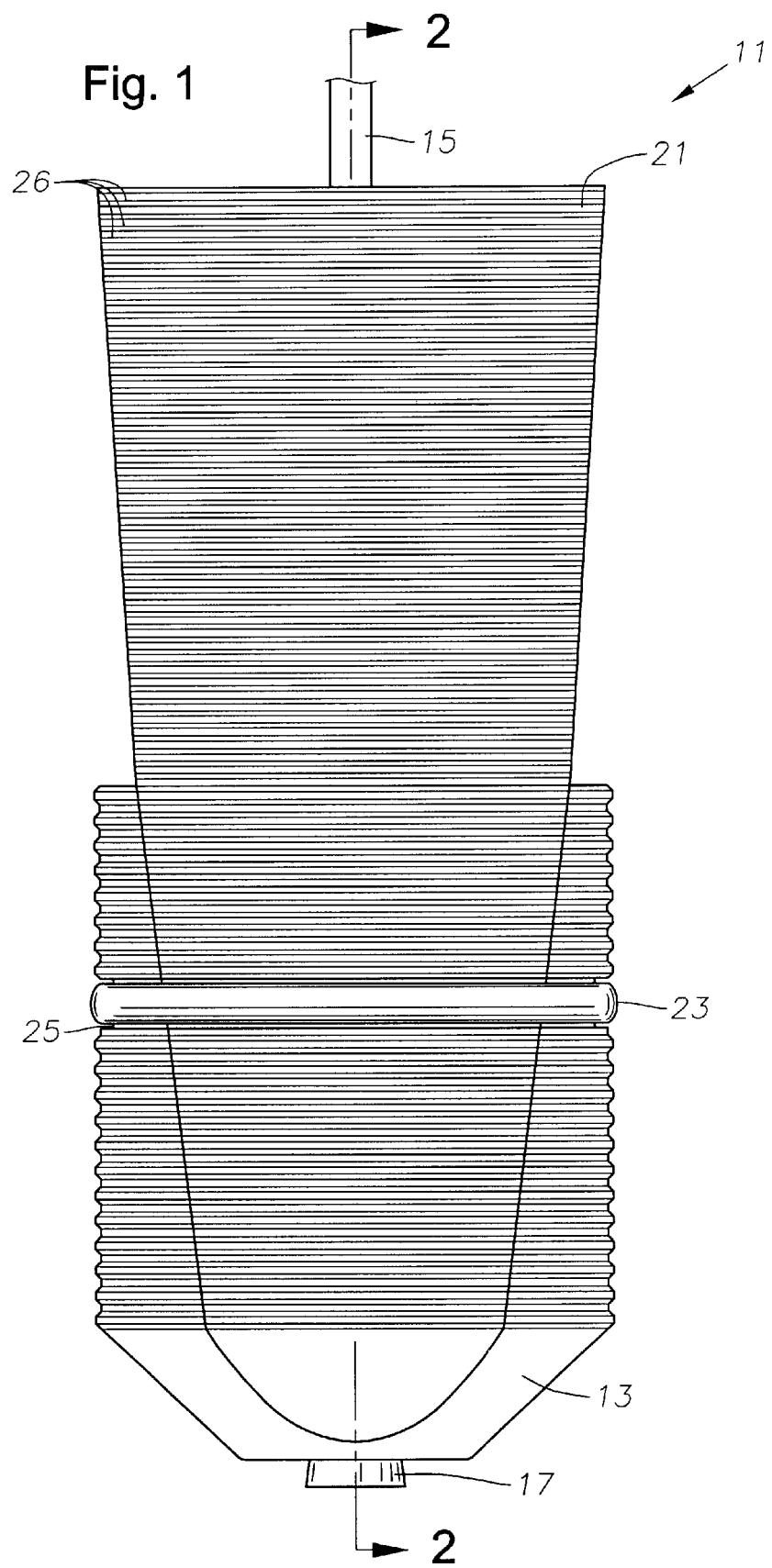

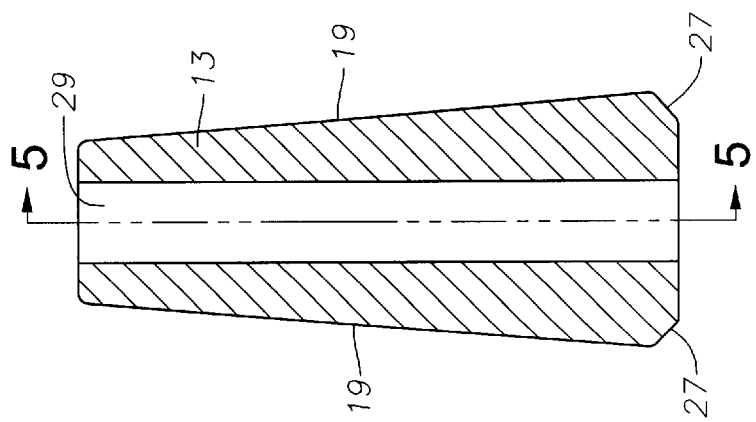
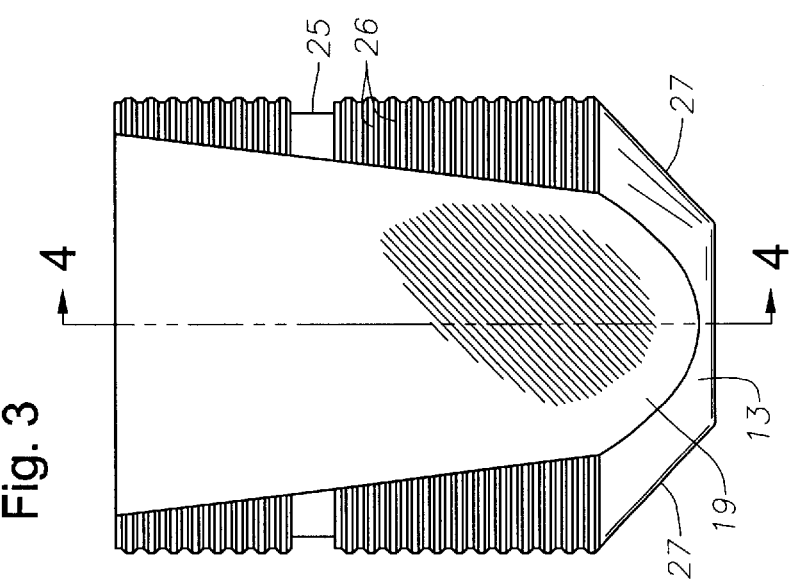
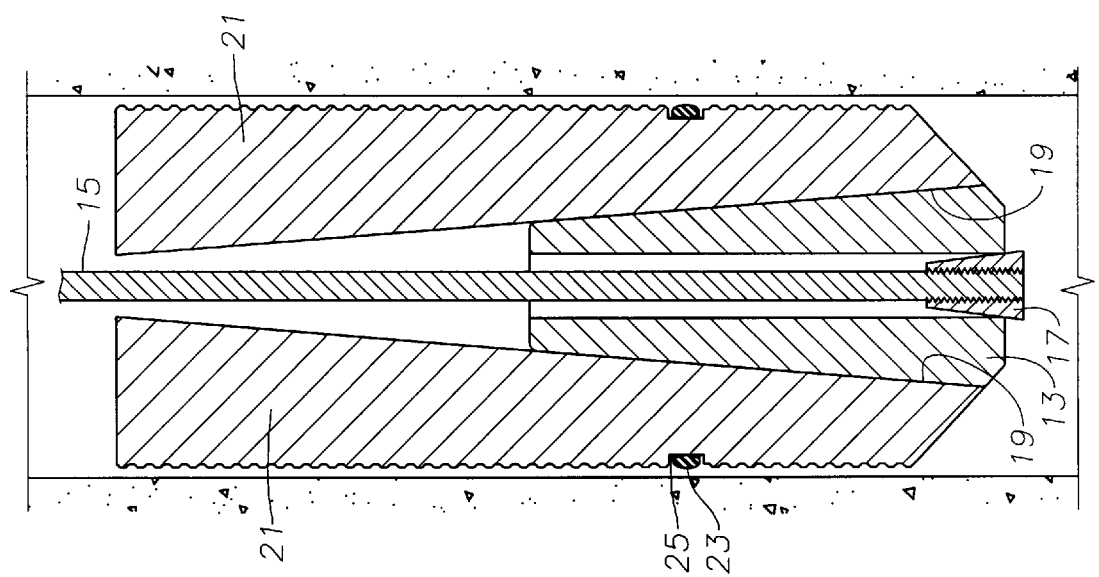

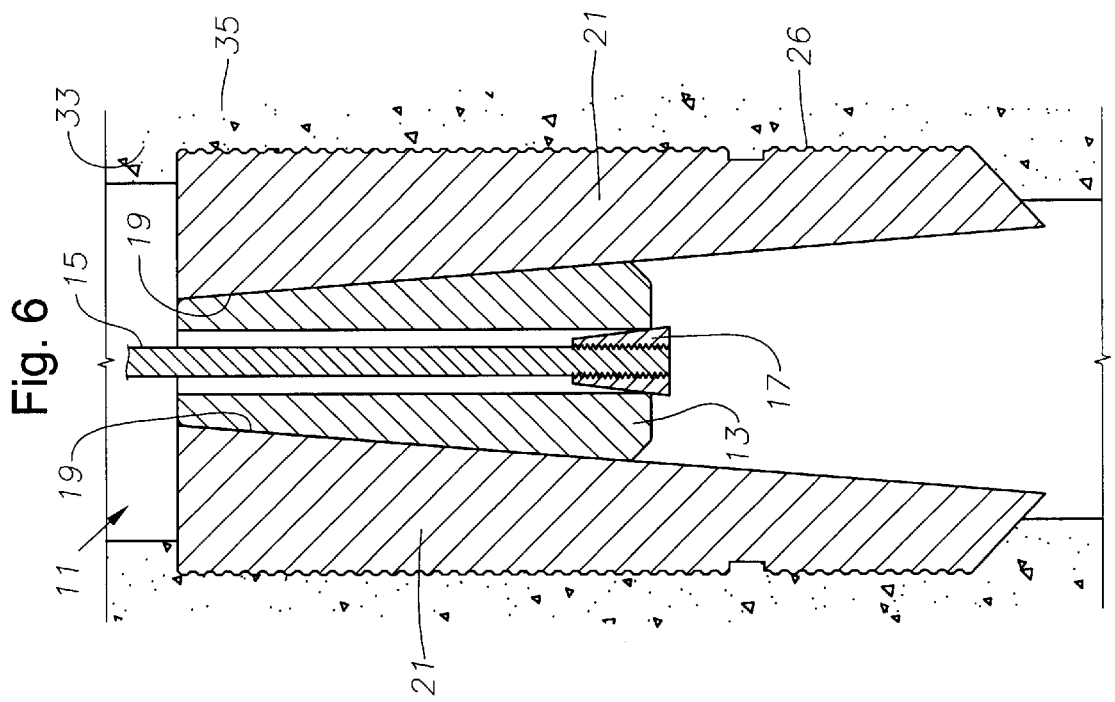
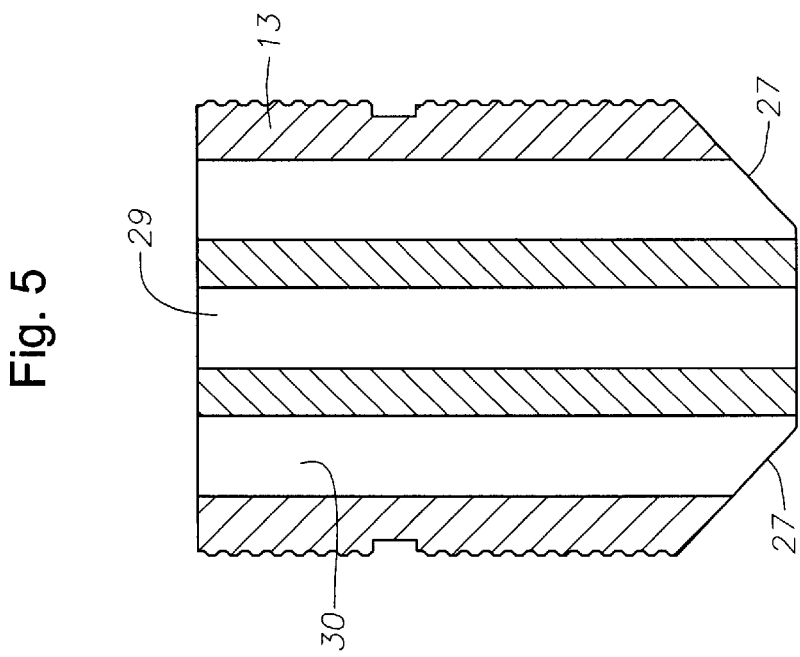

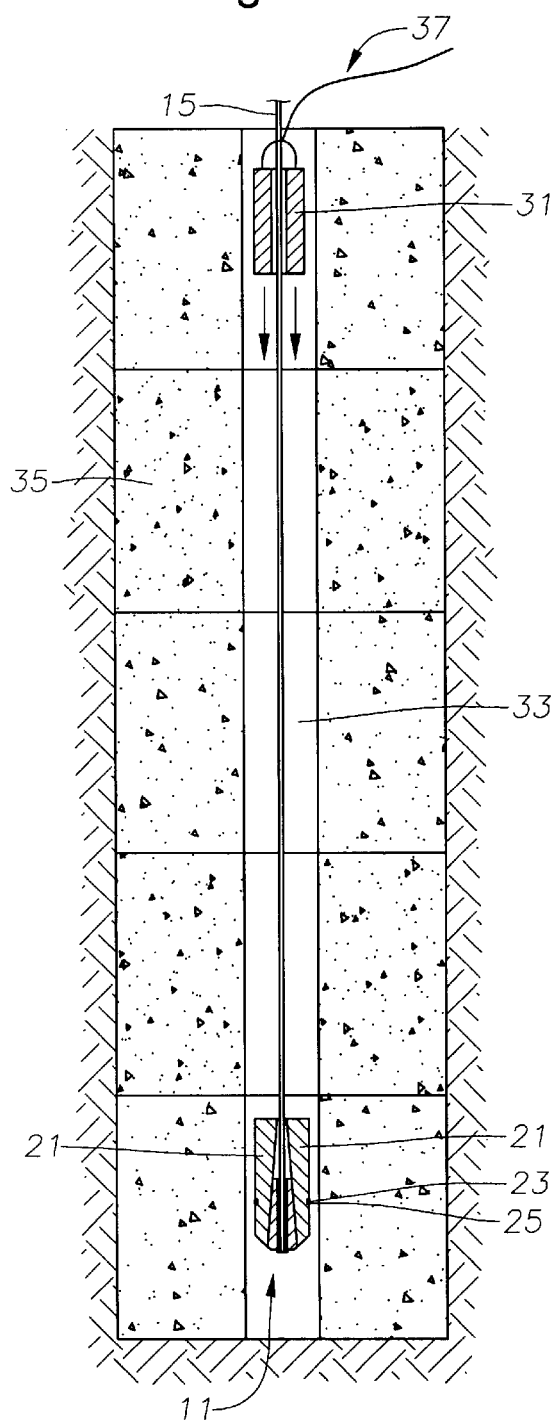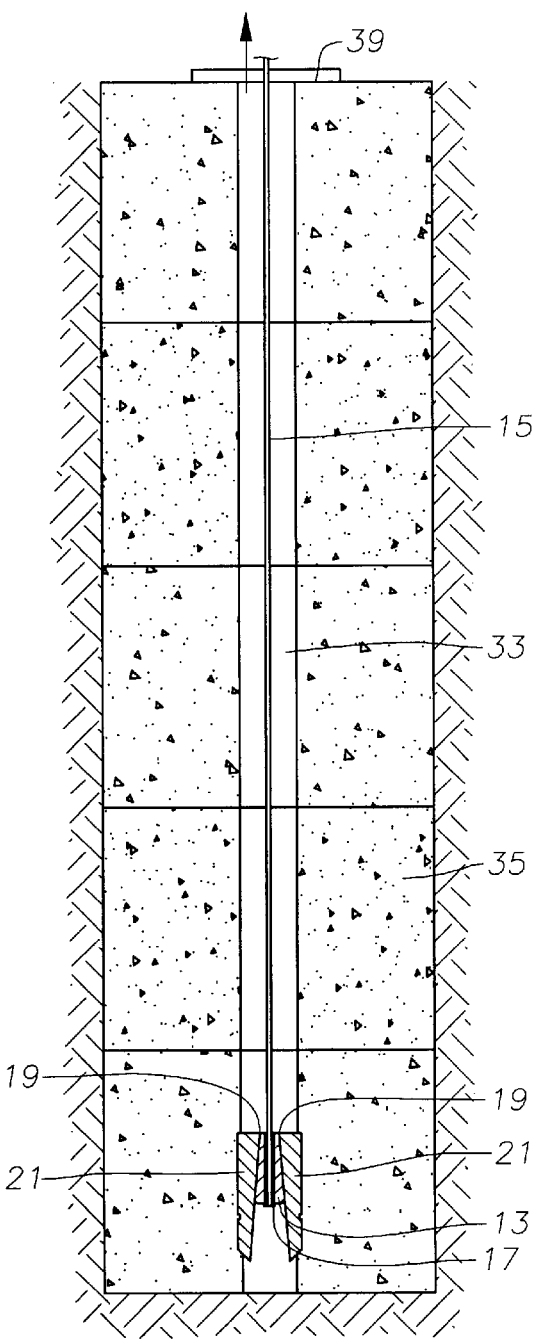

CABLE END WEDGE LOCK

BACKGROUND OF THE INVENTION

1. Field of the Invention

The invention relates generally to a method and apparatus used in underground pilings in the field of foundation repairs, for securing a cable in a piling so that the cable can be used to make the piling more stable.

2. Description of the Related Art

One of the older methods for repairing foundations of buildings having slab-on-ground foundations uses drilled underground piers. Holes are drilled approximately eight to twelve feet in depth and filled with concrete. After the concrete has dried, jacks are placed on top of the pier and the foundation is brought to a level position. The jack is replaced by blocks, shims, and grout. A less expensive method is the use of driven precast solid concrete cylindrical pile sections, which are approximately one foot in height and six inches in diameter. These sections are driven into the earth one on top of the other to form a column or stack of concrete cylinders. The depth to which the bottom of the pier is driven into the earth depends upon the type of soil and zone of the seasonal moisture change. A cylinder having a larger diameter, or a pile cap, is placed on top of the previously driven sections. Jacks are placed on top of the pile cap and the foundation is lifted.

The precast pile method relies upon the skin friction with the soil for its strength. It has the advantage of being faster since the concrete does not have to cure and precasting allows better control of concrete strength. A major disadvantage is that the one foot cylindrical sections may shift and become misaligned. Different methods have been proposed for maintaining alignment between sections. However, most are methods that must be performed after each piling segment is driven into the ground, and can be time consuming.

SUMMARY OF THE INVENTION

The anchoring device in this invention is used to in conjunction with a cable in tension to apply compression to a foundation piling. The compressive state of the foundation piling helps to prevent the individual segments of the foundation piling from slipping or sliding out of alignment. The anchoring device is suspended by a cable into a piling passageway running through all the piling segments. After the anchoring device is lowered to a desired depth, a weight is dropped onto the anchoring device. The force of the weight hitting the anchoring device causes the anchoring device to expand and grip the passageway of the piling. The surface of the anchoring device is textured to prevent the anchoring device from slipping from the piling.

Then tension is applied to the cable. The upward force from the tension is communicated through the anchoring device and into the piling. The upward forces exerted on the lower portion of the piling causes a compressive effect between the upper portion of the piling and the lower portion of the piling. This state of compression helps to prevent the piling segments from sliding relative to each other.

The anchoring device is made up of a centerpiece and at least one anchor wing. The centerpiece has at least one angled face or side that causes the upper portion of the centerpiece to be thinner than the lower portion of the centerpiece. The number of wings depends on how many inclined faces or sides are on the centerpiece. For example, when there are two inclined faces there are also two anchor wings. Each wing is located on the inclined face and is tapered at substantially the same angle as the inclined face. Each wing protrudes above the centerpiece initially. The centerpiece and each wing are held together by a retainer device. When the wings are protruding above the centerpiece and are held in place by the retainer device, the anchoring device is in its initial width position.

The wings protruding above the centerpiece are struck by the weight when the weight is dropped onto the anchoring device. The force of the weight causes the wings to slide down the inclined faces of the centerpiece and also causes the retainer device to disengage from the anchoring device. Each wing slides down the centerpiece along each inclined face, which also causes each wing to travel radially outward. This forces each wing to grip the piling. Ridges or teeth on the outer surface of each wing help to prevent the wings from slipping away from the piling when tension is applied to the cable.

BRIEF DESCRIPTION OF THE DRAWINGS

FIG. 1 is a side elevational view of an anchoring device in its initial width position constructed in accordance with this invention.

FIG. 2 is a cross-sectional view of the anchoring device of FIG. 1 in its initial width position and taken along the line 2—2 of FIG. 1.

FIG. 3 is a side elevational view of a centerpiece of the anchoring device of FIG. 1.

FIG. 4 is a cross-sectional view of the centerpiece of FIG. 3, taken along the line 2—2 of FIG. 3.

FIG. 5 is a cross-sectional view of the centerpiece of FIG. 3, taken along line 3—3 of FIG. 4.

FIG. 6 is a cross-sectional view of the anchoring device of FIG. 1 in its expanded width position.

FIG. 7 comprises a cross-sectional view of the anchoring device of FIG. 1, being lowered into a foundation piling.

FIG. 8 comprises a cross-sectional view of the anchoring device of FIG. 1, in its expanded width position while in a foundation piling.

DETAILED DESCRIPTION OF THE PREFERRED EMBODIMENTS

FIGS. 1 and 2 show an assembled anchoring device 11 in its initial width position. A centerpiece 13 is suspended by a cable 15. In the preferred embodiment, cable 15 is connected to centerpiece 13 by a cable connector 17. Centerpiece 13 has at least one inclined face 19 on its side. At least one wedge or anchor wing 21 is located on inclined face 19. Retainer device 23 holds anchor wing 21 in place against inclined face 19 while anchoring device 11 is in its initial width position. In the preferred embodiment, there are two inclined faces 19 oppositely located on centerpiece 13, and there are two anchor wings 21 that are held to inclined faces 19 by retainer device 23. Retainer device 23 extends around the circumference of anchor wing 21 and centerpiece 13. In the preferred embodiment, a groove 25 is machined into the outer surfaces of centerpiece 13 and anchoring wing 21, for securing retainer device 23. Retainer device 23 may be an o-ring.

FIGS. 3–5 show centerpiece 13 in more detail. FIG. 3 shows centerpiece 13 when looking at an angle directly at inclined face 19, which is the external surface of centerpiece 13 that wing 21 (shown in FIGS. 1 and 2) is secured. In the preferred embodiment, centerpiece 13 is a metal structure, such as steel or iron. Centerpiece 13 is made from a solid metal cylinder. Ridges or teeth 26 are seen on the outer surfaces of both centerpiece 13 and anchor wings 21 after completion. In the preferred embodiment, ridges 26 are parallel circumferentially extending grooves. In the preferred embodiment, a groove 25 is also machined into the outer surface of the centerpiece 13 and wings 21. Groove 25 is cut deeper and wider into the cylinder than ridges 26 so that retainer 23 fits into the recess of groove 25.

An angled face 27 is located on the lower portion of centerpiece 13, making the lower section frusto-conical. Inclined faces 19 are created by cutting opposite sides off of a solid metal cylinder from a desired point on angled face 27 at an upward angle to the top surface of centerpiece 13. Anchor wings 21 (as shown in FIGS. 1–2) are the pieces cut away from the cylinder to form inclined faces 19. The top surface of centerpiece 13 is made when the remaining part of the cylinder is cut to reduce the height of the cylinder. In the preferred embodiment, centerpiece 13 is about one-half the height of the original cylindrical metal structure prior to machining, and thus about one-half the height of wings 21. As shown in FIG. 4, inclined faces 19 are tapered so that the distance between faces 19 is smaller at the upper portion of centerpiece 13 than at the lower portion of centerpiece 13.

Referring to FIGS. 4 and 5, a passageway 29 is drilled axially through centerpiece 13 from the top surface to the bottom surface of centerpiece 13. In the preferred embodiment, cable 15 (shown in FIGS. 1 and 2) runs through passageway 29. In the preferred embodiment, cable connector 17 (shown in FIGS. 1 and 2) is attached to the lower portion of cable 15, and secures cable 15 to centerpiece 13. Referring to FIG. 6, cable connector 17 is a two-piece conical structure surrounding the lower portion of cable 15. Connector 17 tapers so that its lower portion is wider than its upper portion. The wider lower portion of cable connector 17 is wider than the diameter of passageway 29. Therefore, centerpiece 13 connects to cable 15 when passageway 29 lands and engages the wider cable connector 17. The two halves of connector 17 are wedged tightly together to grip cable 15 when tension is applied on cable 15. Passages 30 extend through centerpiece 13 parallel to passage 29 for allowing fluid flow if desired.

Anchor wings 21 have a thinner lower portion than its upper portion. Anchoring wings 21 each have a side which is angled with the same angle of inclination as inclined faces 19 on centerpiece 13. Anchoring wings 21 are in the initial width position when the lower edges of anchoring wings 21 are flush with angled faces 27 and the upper ends are spaced above centerpiece 13, as shown in FIGS. 1 and 2. In other words, anchoring device 11 is in its initial width position when anchoring wings 21 are placed back onto inclined faces 19 where they were before being cut off of the original metal cylinder. When in the initial width position, the portions of groove 25 on anchor wing 21 are aligned with the portion of groove 25 on centerpiece 13 so that retainer device 23 can circumferentially extend around centerpiece 13 and anchoring wings 21. Retainer device 23 may be a rubber o-ring, or a soft metal ring that shears upon encountering a desired force.

As shown in FIG. 6, anchoring wings 21 slide down inclined faces 19 when retainer device 23 is removed. Anchoring device 11 is in its expanded width position when anchoring wings 21 have slid down inclined faces 19 of centerpiece 13. In the preferred embodiment, a weight 31 (shown in FIG. 7) dropped onto anchoring device 11 disengages retainer device 23 (shown in FIG. 1). The force exerted upon anchoring wings 21 from weight 31 also helps move anchoring wings down centerpiece 13 along inclined faces 19. The lower portions of wings 21 protrude below centerpiece 13 after sliding down inclined faces 19. The inclination of faces 19 in addition to the upper portion of wings 21 being wider also causes the lower portions of wings 21 to extend radially away from centerpiece 13. In the preferred embodiment, the piling passage 33 that anchoring device 11 is suspended within is narrower than the width of anchoring device 11 in its expanded width position. Weight 31 has a hole through it for sliding down cable 15 when it is dropped. Ridges 26 (shown in FIG. 1) on the surface of anchor wings 21 provide additional slip resistence, and help to secure anchoring device 11 to piling 35 when tension is applied to cable 15. Piling 35 is a concrete piling as shown in FIG. 7. Optionally, piling 35 can also be steel or other materials. In the preferred embodiment, a weight line 37 (shown in FIG. 7) is attached to weight 31 to retrieve weight 31 after it has been dropped on anchoring device 11.

Referring to FIG. 8, after weight 31 is dropped, cable 15 is pulled from above, creating tension in cable 15. The tension pulls centerpiece 13 up slightly relative to wings 21, further wedging wings 21 into piling 35. In the preferred embodiment, a locking mechanism 39 is placed on top of piling 35. Cable 15 is pulled through locking mechanism 39 until cable 15 is taut. Locking mechanism 39 prevents cable 15 from slipping so that the tension remains in cable 15.

In operation, cable 15 runs through passageway 29 and centerpiece 13 is connected to cable 15 with cable connector 17. Anchor wings 21 are attached to centerpiece 13 on inclined faces 19 and held in place by retainer device 23 extending around anchoring device 11 in groove 25. Anchoring device 11 is initially in its initial width position (shown in FIG. 2) with retainer device 23 extending around anchoring device 11. Referring to FIG. 7, anchoring device 11 is lowered through and suspended in piling passage 33 of a series of a piling segments that comprise foundation piling 35. Weight 31 is dropped into piling passage 33 over cable 15. Weight 31 strikes wings 21 of anchoring device 11. Retainer device 23 disengages from anchoring device 11 due to the downward force resulting from the collision of weight 31 to the top of anchoring device 11.

The downward force from the collision of weight 31 also forces anchor wings 21 to slide down centerpiece 13 along inclined faces 19. As shown in FIG. 8, anchoring wings 21 increase the width of anchoring device 11 as anchor wings 21 slide down inclined faces 19. The outer surface of the lower portions of anchoring wings 21 grips the interior surface of piling passage 33, and secures anchoring device 11 with piling 35. Weight 31 (shown in FIG. 7) is retrieved using weight line 37 (shown in FIG. 7).

Cable 15 is pulled upon from above to so that the cable 15 is in tension. Cable 15 applies an upward force on cable connector 17, which in turn transfers the upward force to centerpiece 13. Centerpiece 13 is prevented from traveling up because inclined faces 19 are in contact with anchor wings 21, and because the lower portion of centerpiece 13 is wider than the space between the tops of anchor wings 21. Therefore, centerpiece 13 exerts an upward force from cable 15 to anchor wings 21. Anchor wings 21 are wedged into piling 35 and ridges 26 help to provide additional friction to prevent anchor wings from sliding away from piling 35. Therefore, the upward force from the tension in cable 15 is translated through centerpiece 13 to anchor wings 21 and to piling 35. The upward force causes a compressive state between the lower portion of foundation piling 35 and the upper portion of foundation piling 35. This compressive state prevents individual segments of piling 35 from sliding out of place. In the preferred embodiment, locking mechanism 39 is placed on top of piling 35 and holds to cable 15 so that cable 15 remains taut. This allows the operator to cut cable 15 above locking mechanism without losing the compressive state of piling 35.

With a piling made in accordance with this method, the anchoring device and the tension of the cable create a compressive force on the piling, thereby preventing segments of the piling from slipping or sliding out of alignment. A piling segment should not slide or shear across the surface of another piling segment when secured in accordance with this method.

Further, it will also be apparent to those skilled in the art that modifications, changes and substitutions maybe made to the invention in the foregoing disclosure. Accordingly, it is appropriate that the appended claims be construed broadly and in the manner consisting with the spirit and scope of the invention herein.

What is claimed is:

1. An anchoring device, comprising:
   a cable;
   a centerpiece connected to the cable having a plurality of sides, at least one of the plurality of sides having an inclined face;
   at least one anchor wing located on the inclined face, the wing being moveable relative to the centerpiece from an initial width position, wherein there is a first combined width of the centerpiece and wing, to an expanded position, wherein the expanded combined width of the centerpiece and wing is larger than the first combined width;
   wherein at a desired depth the wing slides on the inclined face to the expanded position so that tension can be applied to the cable.

2. An anchoring device, comprising:
   a cable;
   a centerpiece connected to the cable having a plurality of sides, at least one of the plurality of sides having an inclined face;
   at least one anchor wing located on the inclined face, the wing being moveable relative to the centerpiece from an initial width position, wherein there is a first combined width of the centerpiece and wing, to an expanded position, wherein the expanded combined width of the centerpiece and wing is larger than the first combined width;
   a weight having a hole positioned therethrough to slide over the cable, striking the anchoring device to cause the anchoring device to move to the expanded position; and wherein at a desired depth the wing slides to the expanded position so that tension can be applied to the cable.

3. The anchoring device of claim 1, wherein the inclined face is tapered in an upward direction so that the width of an upper portion of the centerpiece is less than the width of a lower portion of the centerpiece.

4. The anchoring device of claim 1, wherein the anchor wing protrudes above the centerpiece while the anchoring device is in the initial width position.

5. The anchoring device of claim 1, wherein:
   the centerpiece has two inclined faces, the faces being oppositely located from each other; and
   there are two of the anchor wings, the anchor wings being oppositely located from each other on the inclined faces for sliding engagement relative to the centerpiece.

6. An anchoring device, comprising:
   a cable;
   a centerpiece connected to the cable having a plurality of sides, at least one of the plurality of sides having an inclined face;
   at least one anchor wing located on the inclined face, the wing being moveable relative to the centerpiece from an initial width position, wherein there is a first combined width of the centerpiece and wing, to an expanded position, wherein the expanded combined width of the centerpiece and wing is larger than the first combined width; and wherein
      the centerpiece has two inclined faces, the faces being oppositely located from each other;
      there are two of the anchor wings, the anchor wings being oppositely located from each other on the inclined faces for sliding engagement relative to the centerpiece;
      the two inclined faces are tapered in an upward direction so that the width of an upper portion of the centerpiece is less than the width of a lower portion of the centerpiece; and
      at a desired depth the wing slides to the expanded position so that tension can be applied to the cable.

7. The anchoring device of claim 6, wherein the anchor wings protrude above the centerpiece while the anchoring device is in the initial width position.

8. An anchoring device, comprising:
   a cable;
   a centerpiece connected to the cable having a plurality of sides, at least one of the plurality of sides having an inclined face;
   at least one anchor wing located on the inclined face, the wing being moveable relative to the centerpiece from an initial width position, wherein there is a first combined width of the centerpiece and wing, to an expanded position, wherein the expanded combined width of the centerpiece and wing is larger than the first combined width; and wherein
      the centerpiece has two inclined faces, the faces being oppositely located from each other;
      there are two of the anchor wings, the anchor wings being oppositely located from each other on the inclined faces for sliding engagement relative to the centerpiece;
      at a desired depth the wing slides to the expanded position so that tension can be applied to the cable; and
      a weight having a hole positioned therethrough that slides over the cable to strike the anchor wings and thereby cause the anchoring device to slide into the expanded width position.

9. An anchoring device, comprising:
   a cable;
   a centerpiece attached to an end of the cable, the centerpiece having two inclined faces;
   an anchor wing located on each face for sliding engagement relative to the faces, the wings being movable relative to the centerpiece from an upper initial width position to a lower expanded width position, so that the centerpiece and wings can be lowered by the cable into a bore while in the initial width position; and
   a weight adapted to be dropped over the cable for striking the wings and driving said wings to the expanded width position to grip the bore and allow tension to be pulled on the cable.

10. The anchoring device of claim 9, wherein an outer surface of the wings is textured in order to provide greater resistance to slippage when the anchoring device is in the expanded width position.

11. The anchoring device of claim 9, wherein the two inclined faces are tapered in an upward direction so that the width of an upper portion of the centerpiece is less than the width of a lower portion of the centerpiece.

12. The anchoring device of claim 9, wherein the anchor wings protrude above the centerpiece while the anchoring device is in the initial width position.

13. An anchoring device, comprising:

a cable;

a centerpiece attached to an end of the cable, the centerpiece having two inclined faces;

an anchor wing located on each face for sliding engagement relative to the faces, the wings being movable relative to the centerpiece from an upper initial width position to a lower expanded width position, so that the centerpiece and wings can be lowered by the cable into a bore while in the initial width position;

a passage extending through the centerpiece for the cable and a cable connecting cone that is attached to the lower end of the cable and fits into a lower end of the passage in the centerpeice; and a weight adapted to be dropped over the cable for striking the wings and driving said wings to the expanded width position to grip the bore and allow tension to be pulled on the cable.

14. An anchoring device, comprising:

a cable;

a centerpiece attached to an end of the cable, the centerpiece having two inclined faces;

an anchor wing located on each face for sliding engagement relative to the faces, the wings being movable relative to the centerpiece from an upper initial width position to a lower expanded width position, so that the centerpiece and wings can be lowered by the cable into a bore while in the initial width position;

a weight adapted to be dropped over the cable for striking the wings and driving said wings to the expanded width position to grip the bore and allow tension to be pulled on the cable; and a retainer extending around the centerpiece and the wings to hold said centerpiece and said wings in the initial width position until the weight strikes the wings.

15. An anchoring device, comprising:

a cable;

a centerpiece attached to an end of the cable, the centerpiece having two inclined faces;

an anchor wing located on each face for sliding engagement relative to the faces, the wings being movable relative to the centerpiece from an upper initial width position to a lower expanded width position, so that the centerpiece and wings can be lowered by the cable into a bore while in the initial width position;

a weight adapted to be dropped over the cable for striking the wings and driving said wings to the expanded width position to grip the bore and allow tension to be pulled on the cable; and wherein the two inclined faces are tapered in an upward direction so that the width of an upper portion of the centerpiece is less than the width of a lower portion of the centerpiece; and the anchor wings protrude below and away from the centerpiece while the anchoring device is in the expanded width position.

* * * * *